US009442578B2

(12) United States Patent
Oh et al.

(10) Patent No.: US 9,442,578 B2
(45) Date of Patent: Sep. 13, 2016

(54) CAPACITIVE TYPE STYLUS AND MOBILE TERMINAL COMPRISING THE SAME

(71) Applicant: LG ELECTRONICS INC., Seoul (KR)

(72) Inventors: Hyunseok Oh, Seoul (KR); Myungsun Kim, Seoul (KR); Hyungmo Koo, Seoul (KR); Dongguk Kang, Seoul (KR); Yonghyun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 161 days.

(21) Appl. No.: 13/759,802

(22) Filed: Feb. 5, 2013

(65) Prior Publication Data

US 2014/0035884 A1   Feb. 6, 2014

(30) Foreign Application Priority Data

Aug. 6, 2012 (KR) .................. 10-2012-0085635
Oct. 31, 2012 (KR) .................. 10-2012-0122506

(51) Int. Cl.
*G06F 3/0354* (2013.01)
(52) U.S. Cl.
CPC ................. *G06F 3/03545* (2013.01)
(58) Field of Classification Search
USPC ........................................................ 345/179
See application file for complete search history.

(56) References Cited

U.S. PATENT DOCUMENTS

| | | |
|---|---|---|
| 2,266,942 A | 12/1941 | Wallace |
| 5,584,195 A | 12/1996 | Liu |
| 5,703,626 A | 12/1997 | Itoh et al. |
| 5,877,459 A | 3/1999 | Prater |
| 7,136,052 B1 | 11/2006 | Lam |
| 2002/0023595 A1* | 2/2002 | Kaufman ............ A01K 27/003 119/797 |
| 2002/0105503 A1 | 8/2002 | Oueslati et al. |
| 2005/0073508 A1* | 4/2005 | Pittel et al. ............... 345/175 |
| 2005/0201810 A1* | 9/2005 | Zhu ............................ 401/6 |
| 2010/0006350 A1 | 1/2010 | Elias |
| 2010/0123688 A1 | 5/2010 | Lin |
| 2010/0294574 A1* | 11/2010 | Chen ...................... 178/19.05 |
| 2011/0096039 A1 | 4/2011 | Liang |
| 2011/0242059 A1* | 10/2011 | Pasquero et al. ......... 345/177 |
| 2011/0261026 A1* | 10/2011 | Kim et al. ................. 345/179 |
| 2012/0044214 A1 | 2/2012 | Mori |
| 2012/0139879 A1* | 6/2012 | Kim et al. ................. 345/179 |
| 2012/0214380 A1 | 8/2012 | Vine, III |
| 2013/0266360 A1* | 10/2013 | Elmore ........................ 401/8 |

FOREIGN PATENT DOCUMENTS

DE       26 42 476 A1    3/1978
WO   WO 2009/143911 A1   12/2009

* cited by examiner

*Primary Examiner* — Ilana Spar
*Assistant Examiner* — Jeffrey S Steinberg
(74) *Attorney, Agent, or Firm* — Birch, Stewart, Kolasch & Birch, LLP

(57) ABSTRACT

A capacitive type stylus is provided. The stylus includes a body made of a conductive material, the body being configured to be elastically deformed and, once deformed, to maintain a deformed shape until deformed again, a cover configured to cover at least a portion of the body and a pen tip connected to a first end of the body.

18 Claims, 22 Drawing Sheets

CAPACITIVE TYPE STYLUS AND MOBILE TERMINAL COMPRISING THE SAME

Pursuant to 35 U.S.C. §119(a), this application claims the benefit of earlier filing date and right of priority to Korean Application Nos. 10-2012-0085635 filed on Aug. 6, 2012, and 10-2012-0122506 filed on Oct. 31, 2012, the contents of which are hereby incorporated by reference herein in their entirety.

BACKGROUND OF THE DISCLOSURE

1. Field of the Disclosure

The present invention relates to a capacitive type stylus with easy storage and portability and a mobile terminal including the same, more particularly, to a capacitive type stylus that is wearable on a user's body part for easy storage and portability even as a fashion item, and a mobile terminal including the capacitive type stylus.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to their degree (e.g., ease) of mobility. Further, the mobile terminals can be further classified into handheld terminals and vehicle mount terminals according to the manner of portability.

Such a mobile terminal may be operated via a touchscreen and the functions mentioned above may be implemented on a touchscreen. A user has one of the fingers or an auxiliary pen contacting with the touchscreen to operate the mobile terminal. Such an auxiliary stylus may enable more sensitive operation, compared with the finger, and the auxiliary stylus can be provided in the mobile terminal as an accessory or mounted in the mobile terminal.

However, the stylus provided as an accessory is difficult to carry, with a high risk of loss. The stylus mounted in the mobile terminal may occupy a predetermined space that reduces the mounting space for the other parts. Also, the space for the stylus makes the mobile terminal thick. If a diameter of the stylus is reduced to reduce the space occupied by the stylus, it might be uncomfortable for the user to hold such a stylus and usability might deteriorate. Touch input of a conventional stylus might fail to be recognized even when touch is implemented.

Moreover, such the captive type stylus has technical restriction and simply monotonous design, only to disadvantageously fail to reflect users' personalities or sensitivities.

SUMMARY OF THE DISCLOSURE

Accordingly, the present invention is directed to a capacitive type stylus and a mobile terminal including the same that substantially obviate one or more problems due to limitations and disadvantages of the related art.

An object of the present invention is to provide a mobile terminal that is able to provide a capacitive type stylus that is attachable to a user's body part, with no additional portability or storage, and a mobile terminal including the capacitive type stylus.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To realize the objectives and other advantages of the invention, a capacitive type stylus includes a body made of a conductive material and configured to elastically deform to maintain the deformed shape until forced otherwise; a cover configured to cover at least a portion of the body; and a pen tip connected to at least one end of the body.

In another aspect of the present invention, a capacitive type stylus includes a body which is an elastic metal strip with a longitudinal length longer than a widthwise length which is convexly curved in a widthwise direction, and configured to bend in a longitudinal direction when the convex surface is pressed.

In a further aspect of the present invention, a mobile terminal comprising a first short-range communication module configured to transmit and receive an electric signal wirelessly; a case comprising a controller configured to implement at least one process according to a user's command; and a capacitive type stylus comprising a includes a body made of a conductive material and configured to elastically deform to maintain the deformed shape until forced otherwise; a cover configured to cover at least a portion of the body; and a pen tip connected to at least one end of the body; a second short-range communication module mounted in an end of the body to communicate with the first short-range communication module; and one or more sensors configured to detect at least one of motion of the body and change in the shape of the body and to convert the detected motion or change into an electric signal, wherein the second short-range communication module transmits a corresponding electric signal to the first short-range communication module when detecting at least one of the motion of the body and change in the shape of the body, and the second short-range communication module recognizes the electric signal as a user's command to implement a process corresponding to the electric signal.

Effects and/or advantages obtainable from the present invention are non-limited the above mentioned effect. And, other unmentioned effects and/or advantages can be clearly understood from the following description by those having ordinary skill in the technical field to which the present invention pertains.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DESCRIPTION OF SPECIFIC EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 5:
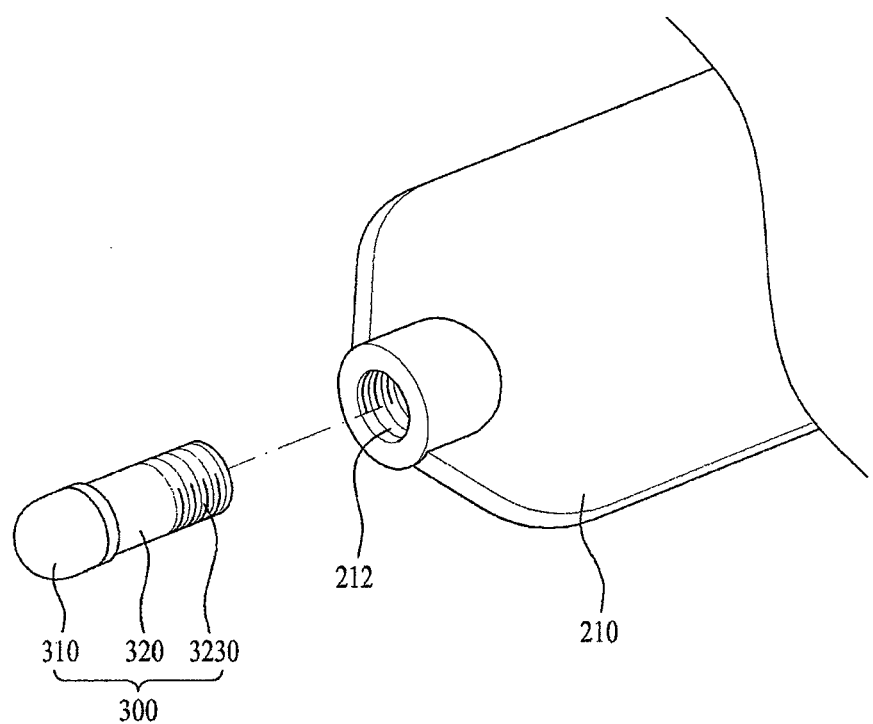
Figure 6:
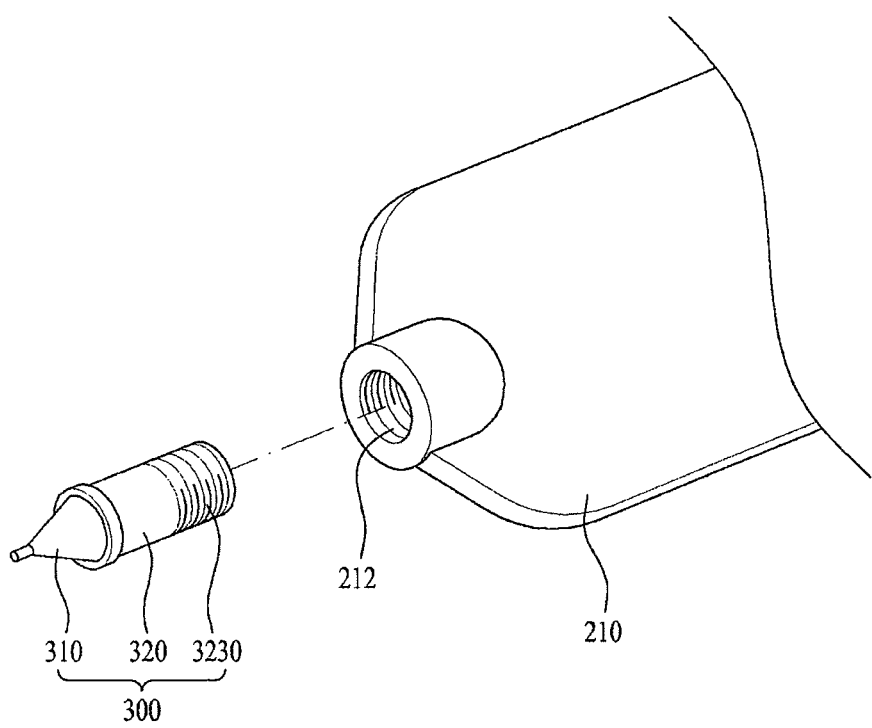
FIG. 6 is a perspective view illustrating another example of a pen tip that is able to be coupled to a body of the pen shown in the embodiment of FIG. 5.
Figure 7:
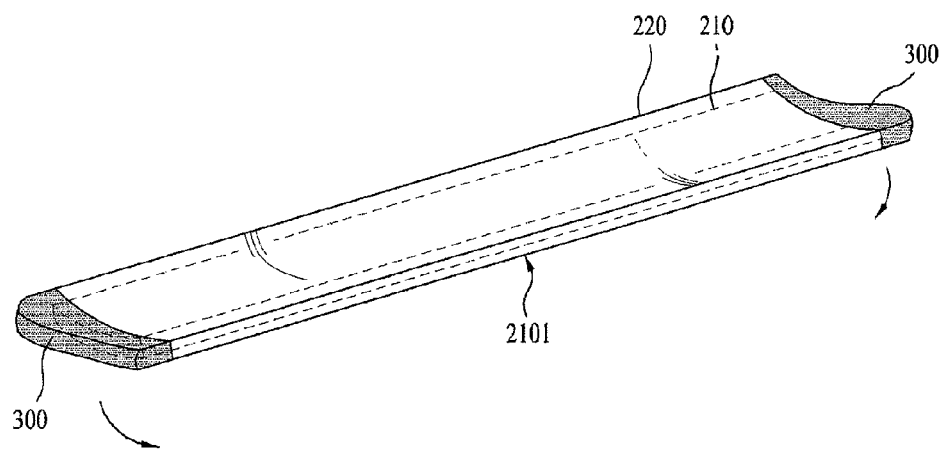
FIG. 7 is a perspective view illustrating a capacitive type stylus according to a second embodiment of the present invention, before being transformed.
Figure 8:
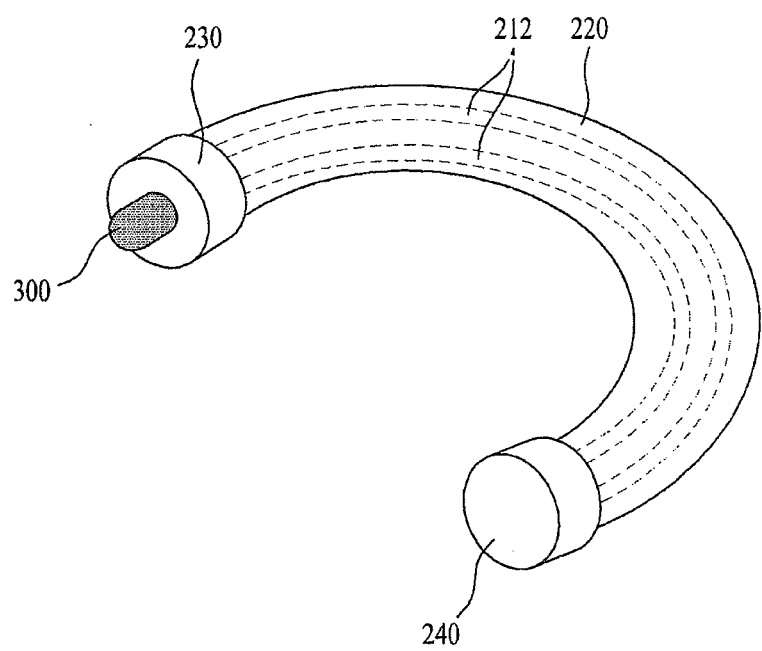
FIG. 8 is a perspective view of a capacitive type stylus according to a third embodiment of the present invention.
Figure 9:
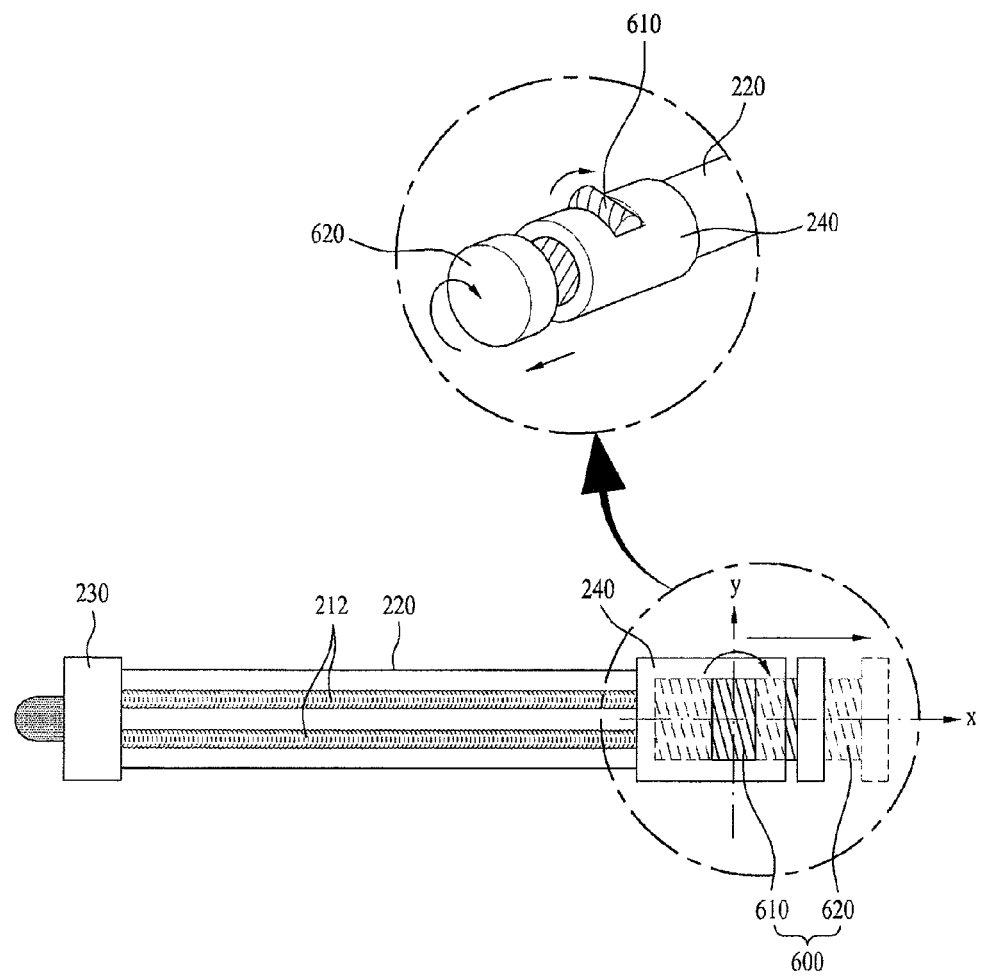
FIG. 9 is a side view illustrating a length adjusting module further provided in the capacitive type stylus according to the embodiment of FIG. 8.
Figure 10:
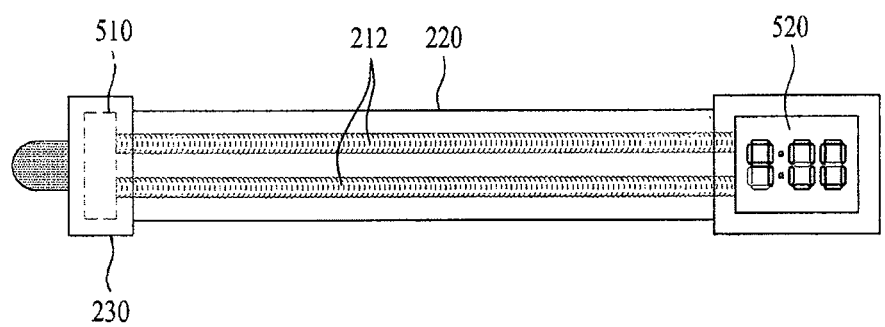
FIG. 10 is a side view illustrating a display further provided in the capacitive type stylus according to the embodiment of FIG. 8.

In the accompanying drawings, FIGS. 1 to 6 show a first embodiment of the present invention and FIG. 7 shows a second embodiment of the present invention. FIGS. 8 to 10 show a third embodiment of the present invention. First to third embodiments will be described sequentially as follows.

Referring to FIGS. 1 to 6, a capacitive type stylus according to a third embodiment will be described.

Figure 1:
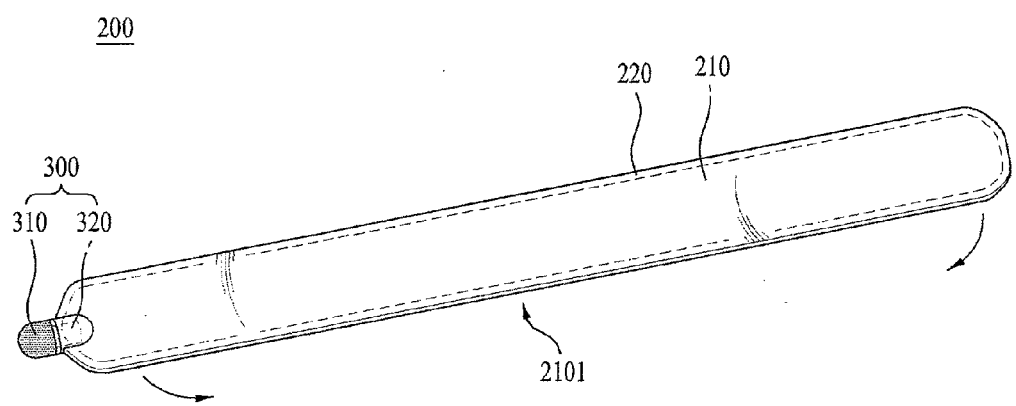
FIG. 1 is a perspective view illustrating a capacitive type stylus according to a first embodiment of the present invention, before being transformed.
Figure 2:
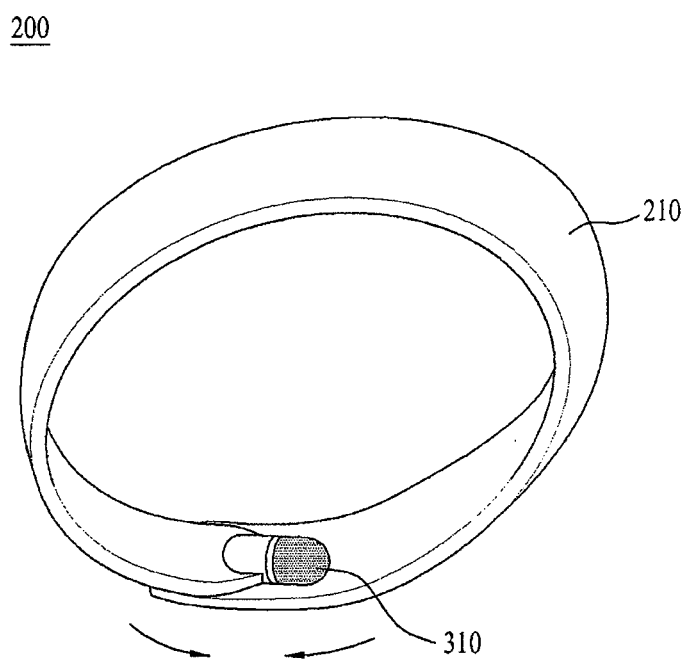
FIG. 2 is a perspective view illustrating the capacitive type stylus according to the first embodiment, after being transformed.
Figure 3:
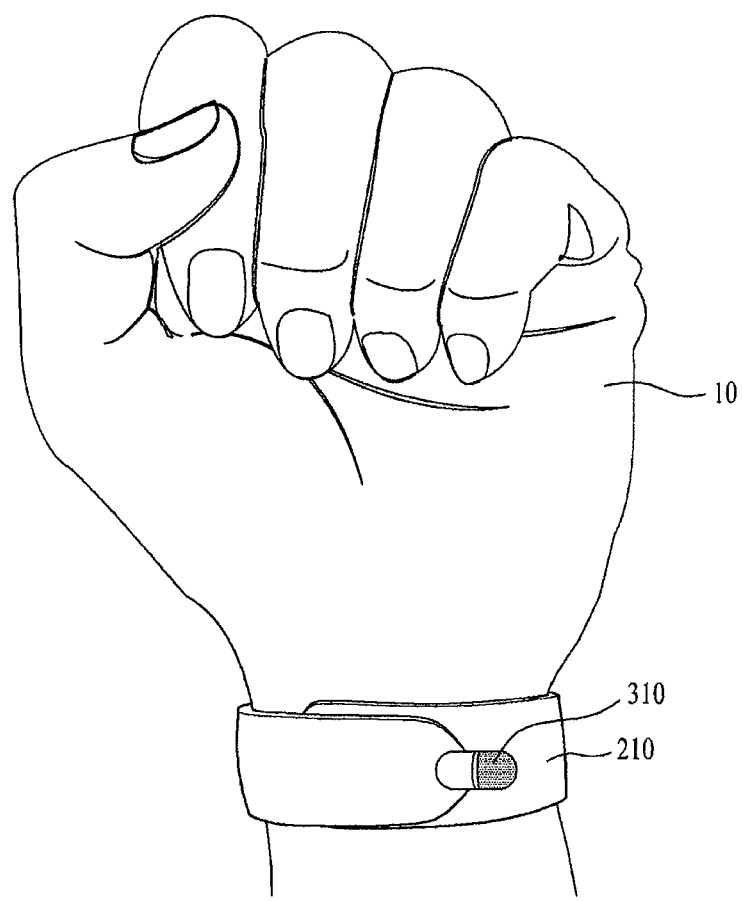
FIG. 3 is a diagram illustrating an example of wearing the capacitive type stylus according to the first embodiment of FIG. 1.

FIG. 1 shows that the stylus according to the first embodiment is used as a capacitive type touch pen. FIG. 2 shows that the stylus is kept and FIG. 3 shows that a user wears the stylus on the wrist 10.

As shown in FIG. 1, the capacitive stylus 200 according to the first embodiment of the present invention includes a body 210 and a pen tip 300.

The body 210 is made of a conductive material to pass electric currents there through. The body 210 elastically deforms and it can maintain the deformed appearance until forced otherwise. For example, the body 210 may be made of one metal and such a metal can be deformed by a force applied by a user. Even without the force applied by the user, the deformed shape of the body 210 can be maintained. When the user holds the body 210 to use the stylus, the body 210 collects a static electricity from the user's body and the static electricity is transferred to the pen tip 300.

As shown in FIG. 1, the body 210 of the capacitive type stylus according to this embodiment may be configured of an elastic metal strip with a longitudinal length longer than a widthwise length which is convexly curved in a widthwise direction. When a convex portion 2101 of the metal strip body 210 is pressed by a predetermined force as shown as an arrow of FIG. 1, an overall longitudinal length of the elastic metal strip is bent outwardly by the elasticity of the plate-shaped body in an arrow direction shown in FIG. 2. The body 210 may be configured of a stainless (SUS) plate.

In other words, the body 210 according to this embodiment is kept in a straight metal strip as shown in FIG. 1, when it is used as a stylus. When the user holding an end of the body 210 strikes the body 210 on the wrist, a predetermined force is applied to the convex portion 2101 of the body 210 and the convex portion 2101 is deformed concavely. As the convex portion 2101 is deformed concavely, the overall length of the body 210 is rolled downward and the shape of the body 210 is deformed as shown in FIG. 2. Accordingly, the stylus may be put on the wrist 10 via the deformed body 210 as shown in FIG. 3.

As shown in FIG. 1, the pen tip 300 is connected to an end of the body 210 formed of the band-shaped plate and it is projected from the end of the body 210 in a longitudinal direction. In one embodiment, the pen tip 300 may include a contacting portion 310 and a connecting portion 320.

The connecting portion 320 is made of a metal and it is extended in a longitudinal direction. For example, the connecting portion 320 is formed in a cylindrical shape having a partially variable diameter along a longitudinal direction. An end of the connecting portion 320 is connected to the end of the body 210 and the contacting portion 310 is provided in the other end of the connecting portion 320. As the connecting portion 320 is made of a metal, the static electricity of the human body transferred to the body 210 may be transferred to the pen tip 300. Preferably, the diameter of the connecting portion 320 may be larger than the thickness of the body 210. In this instance, an area of the contacting portion 310 contacting with a touchpad can be enlarged to operate the capacitive type stylus more stably.

In one embodiment, the connecting portion 320 may be independently with respect to the body 210 and it may be connected to the end of the body 210 after that. In this instance, the metal used in forming the connecting portion 320 may be different from the metal used in forming the body 210.

In another embodiment, the connecting portion 320 may be integrally connected to the body 210. According to this embodiment, the connecting portion 320 is molded together with the body 210 to be longitudinally projected from the end of the body 210. In this instance, the connecting portion 320 and the body 210 may be made of the same metal. When the connecting portion 320 is projected from the end of the body 210 configured of the metal strip, the contacting portion 310 covers an end of the connecting portion 320 to form the pen tip 300.

The contacting portion 310 is made of a conductive and elastic material and it covers the other end of the connecting portion 320. For example, such conductive material having elasticity may include conductive silicon, conductive rubber and the like. The contacting portion 310 can contact with the touch pad provided in the mobile terminal to implement input to the mobile terminal. The display provided in the mobile terminal and the touch pad are configured to form a mutual layer structure to form a touchscreen. The contacting portion 310 can contact with the touchscreen.

When the static electricity of the human body is transferred to the contacting portion 310 via the body 210, a static electricity is also generated in the contacting portion 310. When the static electricity generated in the contacting portion 310 is a predetermined minim electrostatic capacitance or more, a magnetic field of the touch pad contacting with the contacting portion 310 is changed to allow the touch pad to recognize the touch as an input signal. In other words, to enable the capacitive type stylus to operate, the contacting portion 310 of the pen tip 300 has to transfer the static electricity with the minimum capacitance or more to the touch pad. At this time, the electromagnetic capacitance transmitted from the contacting portion 310 is determined by a contact area of the contacting portion 310 with the touch pad. The size of the contact area (hereinafter, referred to as 'a necessary contact area') corresponding to the size of the minimum capacitance with respect to the touch pad may be set differently based on the configuration and function of the touch pad.

As shown in FIG. 1, the diameter of the contacting portion 310 is larger than the thickness of the body 210 in this embodiment. When the capacitive type stylus according to the present invention can realize a relatively large contact area in case of being touched on the touch pad, with the thin plate-shaped body 210. Accordingly, the capacitive type stylus of this embodiment can be operated even on a touch pad having a relatively large necessary contact area. It is preferred that the diameter of the contacting portion 310 is 7 mm or more. In this instance, the capacitive type stylus in case of contacting with the touch pad can be operated on most of the region of the touch pad.

Meanwhile, the connecting portion 320 is projected form a rear end of the contacting portion 310 and it is connected to the end of the body 210. The connection between the connecting portion 320 and the body 210 may enable the pen tip 300 connected to the end of the body 210. Also, the connecting portion 320 may be made of a conductive material. In this instance, the human static electricity collected via the body 210 may be transmitted to the contacting portion 310 via the connecting portion 320. In one embodiment, the connecting portion 320 may be integrally connected to the contacting portion 310.

According to the present invention, the body capable of maintaining the deformed shape after the bending deformation may deform the shape of the stylus. The user straightens the body 210 to use the stylus as a pen. In case of not using the stylus, the user rolls the body 210 to wear the stylus on the wrist 10. Accordingly, the user can carry and keep the stylus conveniently and easily even without putting it in a bag separately. Also, the user can wear it on one of body parts and prevent risks of loss.

In one embodiment, the capacitive type stylus as shown in FIG. 1 may further include a cover 220 configured to partially cover the body 210. Specifically, the cover 220 may be made of at least one of various-colored silicon, rubber and urethane. In this instance, the cover 220 and the body 210 may be integrally formed with each other by an insert-injection molding. Optionally, the cover 220 may be made of leather and the materials used for the cover 220 are not limited thereto. Any elastic materials can be used in forming the cover 220.

The cover 220 may be conductive or non-conductive. Even in case it is made of a non-conductive material, the cover 220 is formed thin. When the user is holding the body 210 covered by the cover 220, the human static electricity traverses the thin cover 220 and reaches the body 210. As shown in FIG. 1, the cover may cover only the body 210 and the connecting portion 320 of the pen tip 300, or only the body 210. Optionally, it may cover the body 210 and the both portions (the contacting portion 310 and the connecting portion 320) of the pen tip 300.

The cover can be made of such various materials to have various colors and textures, such that the user may select a color and a texture according to his or her taste. Accordingly, the user can wear the stylus so that his or her personality is reflected therein and utilize it as a fashion item.

Figure 4:
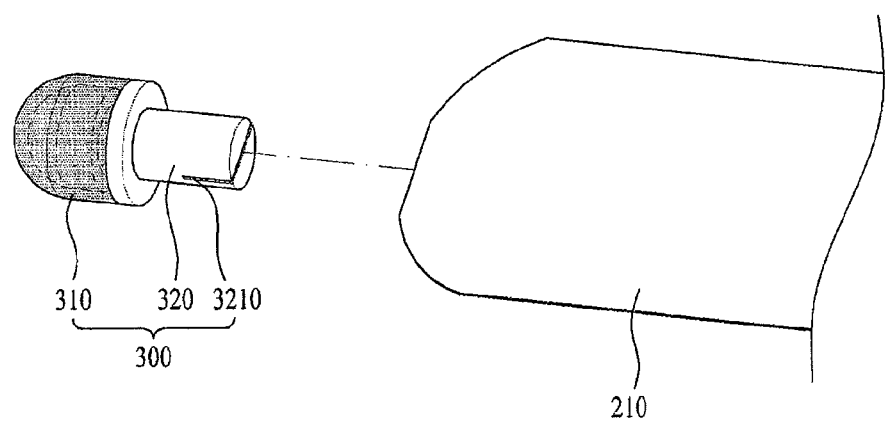
FIGS. 4 and 5 are exploded perspective views illustrating various examples of a coupling structure between a pen tip and the capacitive type stylus according to the first embodiment, respectively.

The main configuration of the capacitive type stylus according to the present invention is described above. Referring to FIGS. 4 to 6, a specific configuration and connection structure of the pen tip connected to the body 210 in the capacitive type stylus according to the first embodiment of the present invention will be described as follows. FIG. 4 shows the structure of inserting the body in the connecting portion of the pen tip. FIGS. 5 and 6 illustrate a screw-fastening structure between the connecting portion of the pen tip and the body.

In one embodiment, the end of the body 210 is inserted in the connecting portion 320 of the pen tip 300 as shown in FIG. 4, only to connect the pen tip 300 and the body 210 with each other. For that, an inserting groove 3210 traversing an end surface of a rear end of the connecting portion 320 may be formed in the rear end of the connecting portion 320 and the end of the body 210 can be inserted in the inserting groove 3210. Specifically, as shown in FIG. 4, the connecting portion 320 may be cylindrical-shaped and the inserting groove 3210 is recessed in a longitudinal direction of the connecting portion 320 passing a center of the end surface of cylindrical connecting portion 320.

The width of the inserting groove 3210 formed in the connecting portion 320 may be the same as or smaller than the thickness of the body 210. When the width of the inserting groove 3210 is smaller than the thickness of the body 210, the connecting portion 320 and the body 210 may be forcibly coupled to each other in inserting the end of the body 210 in the connecting portion 320. Accordingly, the pen tip 300 may be fixed to the body firmly.

Optionally, before the end of the body 210 is inserted in the inserting groove 3210, an adhesive may be applied to at least one of an inner surface of the inserting groove 3210 and the end of the body 210. When the body 210 is inserted in the inserting groove 3210, with the adhesive applied thereto, the pen tip 300 can be effectively fixed to the body 210 by the adhesion of the adhesive.

In another embodiment, the pen tip 300 may be detachably coupled to the body 210. In this instance, the connecting portion 320 of the pen tip 300 and the body 210 are not connected with each other by using the forcible coupling or the adhesive. There may be provided a plurality of pen tips 300 including contacting portions 310 with different diameters or shapes with respect to one body 210, respectively.

One of examples, as shown in FIG. 5, such a detachable pen tip 300 may be realized by screw-fastening between the connecting portion 320 and the body 210. For that, a screw-thread 3230 may be formed in an outer peripheral surface of the connecting portion 320 of the pen tip 300 and a fastening groove 212 recessed in a longitudinal direction of the body may be formed in the end of the body 210. It is preferred that a screw groove corresponding to the screw thread 3230 of the connecting portion 320 is formed in an inner peripheral surface of the fastening groove 212. The connecting portion 320 of the pen tip 300 may be inserted in the fastening groove 212 to be screw-fastened to the body 210. In this instance, such simple screw-fastening may enable the pen tip 300 detachably coupled to the connecting portion 320. Accordingly, assembling workability and usability in case of detaching may be enhanced.

As shown in FIG. 6, in case the pen tip 300 is detachably coupled to the body 210, the user can replace the pen tip 300 with a new pen tip 300 having a contacting portion 310 with a different shape from the contacting portion 310 with the shape shown in FIGS. 1 to 5. When a front end of the contacting portion 310 has a small diameter, a contact area with the touch pad is relatively small but a more sensitive touch can be realized. The user can connect the pen tip 300 with the shape shown in FIG. 6 to the body 210 with respect to the touch pad having a small necessary contact area, such that he or she can implement more sensitive touch input via the capacitive type stylus according to the present invention.

In other words, the user can properly utilize the capacitive type stylus by replacing the pen tip 300 according to various purposes.

Referring to FIG. 7, a second embodiment of the present invention will be described as follows. FIG. 7 is a perspective view of a stylus according to a second embodiment.

As shown in FIG. 7, a pen tip 300 may be formed in each of opposite ends of a metallic plate-shaped body 210. The pen tip 300 can be made of conductive silicon. To enable the body 210 to transfer the collected human static electricity to the pen tip 300 effectively, the pen tip 300 may be formed to cover an end of the body 210.

To make the stylus operated in a capacitive way, the pen tip 300 has to the static electricity having a predetermined capacitance or more to a touch pad. The electrostatic capacitance transferred from the pen tip 300 may be determined based on a contact area between the pen tip 300 and the touch pad. To satisfy the minimum contact area for the electrostatic capacitance, an end of the pen tip 300 may has a blunt shape as shown in FIG. 7 and the stylus according to this embodiment can implement a capacitance type touch input stably.

Referring to FIGS. 8 to 10, a stylus according to a third embodiment of the present invention will be described as follows.

FIG. 8 illustrates that a shape of a stylus according to a third embodiment is deformed. FIG. 9 illustrates that the stylus further includes a length adjusting module 600 to adjust the length thereof. FIG. 10 illustrates that the stylus according to the third embodiment includes a display module 520 configured to output an image.

As shown in FIG. 8, a body 210 of the stylus according to this embodiment may be one metal cable 212 or more. At this time, the stylus may further include a first supporting portion 230 having an end coupled to an end of a cable 212 and the other end having a pen tip 300 fixed thereto, and a second supporting portion 240 having the other end of the cable 212 coupled thereto. The position of the cable 212 can be fixed by the first and second supporting portions 230 and 240. The first supporting portion 230 may be made of a conductive material such as stainless (SUS) to transfer the human static electricity collected via the metal cable 212 to the pen tip 300 effectively.

For example, the metal cable 212 defining the body 210 may be configured of a cobra-pipe shown in FIGS. 9 and 10. Such a cobra pipe has pieces of iron wound in a radial direction to be bent artificially and the cobra pipe can maintain the deformed shape. Rather than the cobra pipe, the metal cable 212 includes a wire having good flexibility and durability inserted in the cobra pipe to enhance the strength of the cobra pipe.

In this embodiment, a cover 220 having various colors and textures covers the body 210 configured of the metal cable 212. As mentioned above, even when the cover 220 is non-conductive, the human static electricity may be transferred to the body 210 via the cover 220 and the user may express his or her personality via the various-colored and textured cover 200.

As shown in FIG. 8, the body 210 of the stylus is deformed by the user's power and the deformed shape is maintained, only to curve the stylus. The user can bend the body 210 of the stylus as shown in FIG. 8 to wear and keep the stylus on one of body parts such as the wrist shown in FIG. 3, unless using the stylus. When desired to use the stylus, the user can spread the body 210 artificially to separate it from the body part.

When the body 210 of the stylus is configured of the metal cable 212, it is preferred that a plurality of metal cables 212 may be provided. Both ends of two or more metal cables 212 are fixed to first and second supporting portions 230 and 240, respectively, to arrange the two or more metal cables 212 in parallel. After that, the metal cables 212 repeat bending deformation several times, to prevent entanglement. Accordingly, the body 210 of the stylus may not be distorted even if the user repeats usage and storage of the stylus and the durability and usability of the stylus can be enhanced.

In one embodiment, the capacitive stylus according to the third embodiment may further include a length adjusting module 600 provided in the second supporting portion 240. Not to interfere with the pen tip 300, the length adjusting module 600 may be provided in the second supporting portion 240 not connected with the pen tip 300, out of the first and second supporting portions 230 and 240 connected to both ends of each metal cable 212. The length adjusting module 600 provided in the second supporting portion 240 may be extendible longitudinally to adjust the overall length of the stylus.

As the overall length of the stylus is adjustable by the length adjusting module 600, the stylus can be worn by the user on a body part, regardless of the user's body size. For example, in case the user is an adult male having a relatively large body size, the length adjusting module 600 extends the overall length of the stylus to make him or her wearing the stylus comfortably. In case the user is a child having a relatively small body size, the length adjusting module 600 may reduce the overall length of the stylus.

Specifically, as shown in FIG. 6, the length adjusting module 600 includes an insert screw 620, an adjusting screw 610 engaging with the insert screw 620 to rotate. The insert screw 620 may be longitudinally inserted in the second supporting portion 240 coupled to the end of the body 210. The insert screw 620 has a predetermined thickness enough to form a gap between the second supporting portion 240 and the insert screw 620, such that it can freely move in a longitudinal direction within the second supporting portion 240. The adjusting screw 610 may be coupled to the second supporting portion 240 to be rotatable while engaging with the insert screw 610. As shown in FIG. 9, the adjusting screw 610 is coupled to an outer peripheral surface of the second supporting portion 240, to be exposed via a side surface of the second supporting portion 240. In this instance, the user can easily rotate the adjusting screw 610 via friction between the exposed portion of the adjusting screw 610 and the user's finger.

The insert screw 620 and the adjusting screw 610 may engage with each other to allow the adjusting screw 610 to move in a longitudinal direction of the body 210 while rotating in communication with the insert screw 620. For that, a screw thread formed in an outer peripheral surface of the insert screw 620 may be spiral to engage with a screw thread of the adjusting screw 210. As shown in FIG. 9, a shaft (y-axis) of the adjusting screw 610 may be perpendicular to a shaft (x-axis) of the insert screw 620. Although not shown in the drawings herewith in the specification, the shaft of the adjusting screw 610 and the shaft of the insert screw 620 may be formed in parallel.

As shown in an arrow of FIG. 8, the adjusting screw 610 is rotated on y-axis by the user in a predetermined direction and the insert screw 620 is then rotated on x-axis in a predetermined direction by the rotation of the adjusting screw 610, only to move outside the second supporting portion 240 along a longitudinal direction of the body 210. As the insert screw 620 is moving outside the second supporting portion 240, the overall length of the stylus can be increased. In contrast, when the user rotates the adjusting screw in the reverse direction although not shown in the drawings, the insert screw 620 is also rotated in the reverse direction to move into the second supporting portion 240. In this instance, as the insert screw 620 is moving into the second supporting portion 240, the overall length of the stylus can be decreased.

In another embodiment, the capacitive type stylus according to the third embodiment may further include a battery 510 mounted in the body 210 of the stylus, and a display module 520 formed in the body 210 of the stylus to output an image when receiving the electric power, as shown in FIG. 10.

The battery 510 may be mounted in either of the first and second supporting portions 230 and 240 and it may supply the electric power to the stylus. The display module 520 may be formed in the other one of the first and second supporting portions 230 and 240 where the battery 510 is not mounted. The battery 510 and the display module 520 are provided in different positions, such that the sizes of the first and second supporting portions 230 and 240 may be reduced as much as possible to make the stylus maintain a slim shape.

The display module 520 formed in opposite to the battery 510 to be supplied the electric power of the battery 510 via one or more conductive metal cable 212 defining the body 210. For that, an end of the metal cable 212 may be connected to the battery 510 and the other end of the metal cable 212 may be connected to a PCB configured to drive the display module 520. In one embodiment, the display module 520 may be configured of an organic light emitting diode and it may be driven with a low electric power accordingly.

The usability of the capacitive type stylus can be enhanced by the display module 520 formed in the body 210. For example, the display module 520 outputs an image of an electronic watch and the capacitive type stylus can be used as an electronic watch. Optionally, the display module 520 outputs images including various photographs and it can be used as a tool for expressing the user's personality and sensitivity.

The body and the pen tip that compose the capacitive type stylus according to the first to third embodiments of the present invention are described above. Next, referring to FIG. 19, a configuration of a capacitive type stylus according to a further embodiment of the present invention will be described as follows.

Figure 19:
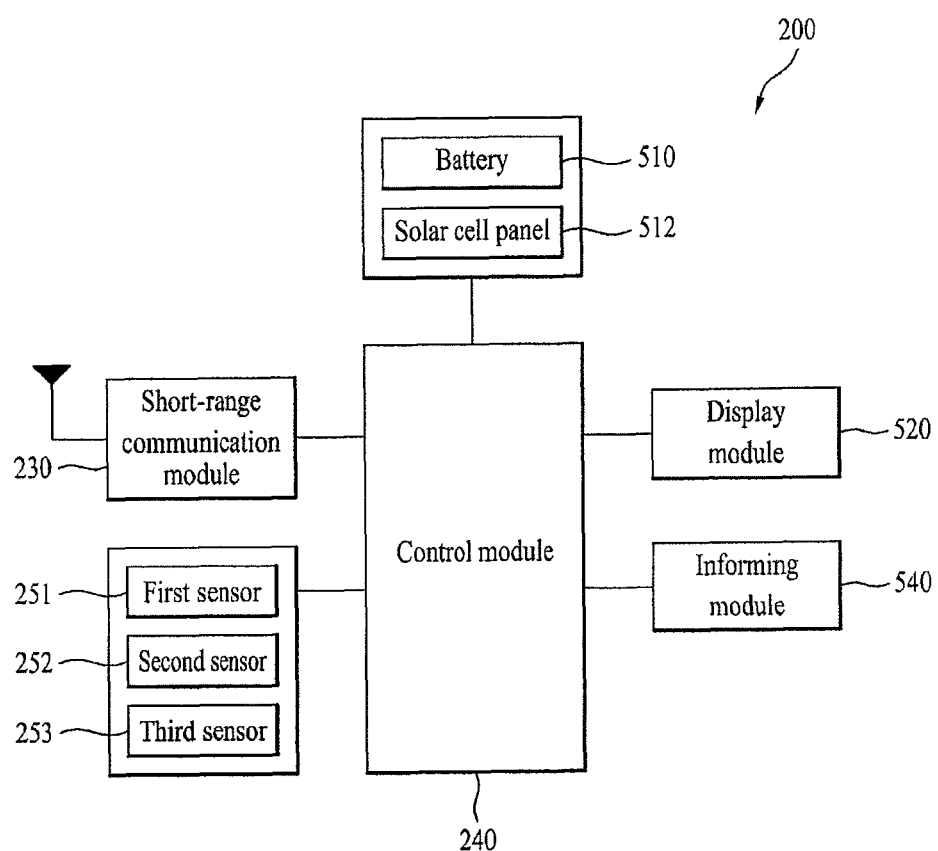
FIG. 19 is a block diagram of a capacitive type stylus according to the first embodiment of the present invention.

FIG. 19 is a block diagram of the capacitive type stylus according to this embodiment.

As shown in FIG. 19, the capacitive type stylus according to this embodiment of the present invention may further include a short-range communication module, a sensing unit, a display module 520, an informing module 540, a control module 240 and a power supply unit. The components shown in FIG. 19 are not necessarily provided and a capacitive type stylus including more or less components may be realized. Here, the capacitive stylus according to the present invention necessarily includes the body and the pen tip described above. The components shown in FIG. 19 may be provided or mounted in the body.

The components will be sequentially described as follows.

The short-range communication module 230 facilitates relatively short-range communications with a mobile terminal in a short-range. Suitable technologies for implementing this module include radio frequency identification (RFID), infrared data association (IrDA), ultra-wideband (UWB), as well at the networking technologies commonly referred to as Bluetooth and ZigBee, to name a few. Specifically, the short-range communication module 230 communicates with an auxiliary short-range communication module (114, see FIG. 20) provided in a case of the mobile terminal to transmit and receive an electric signal or data. The short-range communication module 230 may be mounted in an end of the body.

As the short-range communication module 230 is provided, the capacitive type stylus can be operated in communication with the mobile terminal. When the capacitive type stylus is in communication with the mobile terminal, the operation of the mobile terminal can be controlled by using the capacitive type stylus. Also, the operation of the stylus can be controlled by using the mobile terminal. As a result, the usage range of the capacitive type stylus is enlarged remarkably.

The sensing unit generates electric signals and relating data for sensing status measurements of various aspects of the user wearing the capacitive type stylus. The generated electric signals and data may be transmitted to the control module 240. The control module 240 receiving the electric signal or data may control the other components of the capacitive type stylus based on the electric signal or data, or control the electric signal or data transmitted to the case of the mobile terminal. The case of the mobile terminal may control the operations of the mobile terminal based on the electric signal or data.

Specifically, the sensing unit may include at least one of a first sensor 251 for sensing motion of the body, a second sensor 252 for sensing deformation of the body and a third sensor for sensing body motion made by the user wearing the capacitive type stylus.

The first sensor 151 may be mounted in the body of the capacitive type stylus and it may convert the sensed motion of the body into an electric signal. The motion of the body may include the translation performed by the body in up-and-down/right-and-left directions and the rotation of the body. Optionally, the motion of the body may include a case where those translation and rotation are performed simultaneously. For example, the first sensor 251 may detect the motion of the body rotating on a center space in a bent state. Also, the first sensor 251 may detect the motion of the body in the direction the force of gravity activates or in the reverse direction. The first sensor 251 may include a Gyro sensor, an acceleration sensor, a gravity sensor and a motion recognition sensor including a geomagnetic sensor.

The second sensor 252 may be mounted in the body of the capacitive type stylus and it may convert a bent or straightened state of the body into an electric signal. As mentioned above, the body of the capacitive type stylus according to the present invention has the convex portion deformed concavely to be rolled. The user applies a force to the rolled body to change the concavely deformed surface into a convex portion again and then the body is straightened. In other words, the body of the capacitive type stylus may have two shapes configured of the bent state or the linearly straightened state. The second sensor 252 may detect the bent state of the body and the linearly straightened state of the body. For example, the second sensor 252 may include a flex sensor (or a bending sensor) attached to the body to be bent together when the body is rolled to covert a bending level into an electric signal.

The third sensor 253 may be mounted in the body of the capacitive type stylus to collect biometric information on a person contacting with the body. As mentioned above, the body of the capacitive type stylus has a deformable shape that can be rolled curvedly such that the user may wear the stylus on the wrist 10 like a bracelet. When the user puts on the body on the wrist 10, biometric information on the user may be directly transmitted to the body and the third sensor 253 may collect the biometric information. The biometric information may include Electrocardiogram (ECG), a heart rate per minute, a pulse rate and a temperature. The third sensor 253 may measure such the biometric information at preset regular intervals and it may generate biometric information data based on the collected biometric information.

The display module 520 may be formed in a surface of the body and it may output the information processed in the control module 240 of the capacitive type stylus or transmitted from the case of the mobile terminal. For example, the display module 520 may output user interface (UI) provided with input of a command by the user via touch input. The display module 520 may output information associated with data on a call signal, a message and a social network service (SNS) transmitted to the case of the mobile terminal.

The display module 520 may be configured of an organic light emitting diode (OLED) or a flexible display. In this instance, the shape of the display module formed in the surface of the body can be deformed and the body can be curvedly rolled or linearly straightened with no interference of the display module 520.

Optionally, the display module 520 may be configured of a touchscreen. For that, the display module 520 and the touch pad may form a mutual layered structure or they may be integrally formed with each other as one body. In case the display module 520 is configured of a touchscreen, the display module 520 detects and coverts a touch input implemented on the display module 520 by the user into an electric signal. The electric signal may be transmitted to the control module 240 and the control module 240 may control the capacitive type stylus based on the electric signal or transmit the electric signal to the case of the mobile terminal.

The informing module 540 may be provided in the body of the capacitive type stylus to output a signal to inform event generation. At this time, such an event may be generated in the case of the mobile terminal. When an event is generated, the case of the mobile terminal may generate and transmit an electric signal to the short-range communication module of the capacitive type stylus. When receiving the electric signal, the control module 240 may control the informing module 540 to output a signal. The signal the informing module is able to output may include all of video, audio, tactile signals. For example, the informing module 540 may include LED elements emitting specific color lights, respectively, a vibration module generating vibration and a bone conduction vibrating device for vibrating the user's bone conduction.

The control module controls the short-range communication module, the sensing unit, the display module 520 and the informing module 540, to control the general operation of the capacitive type stylus. For example, the control module 240 may control the operations of the other components based on the electric signal generated in the sensing unit. Optionally, the control module may control the short-range communication module to exchange an electric signal or data with the case of the mobile terminal or it may recognize written input implemented on the display module 520 configured of the touchscreen as letters.

The power supply unit may provide the electric power to the short-range communication module, the sensing unit, the display module 520, the informing module 540 and the control module 240 which are provided in the capacitive type stylus. For example, the power supply unit may be a rechargeable battery 510. The battery 510 may be mounted in the body of the capacitive type stylus or detachably coupled to the body. As another example, the power supply unit may be a solar cell panel 512 converting solar light into electric energy. Such a solar cell panel 512 may be provided in a surface of the body, with being electrically connected with the short-range communication module and the control module 240.

Before describing the detailed structure and operation of the capacitive type stylus, the detailed configuration of the case composing the mobile terminal, which can communicate with the capacitive type stylus, will be described referring to FIG. 20.

Figure 20:
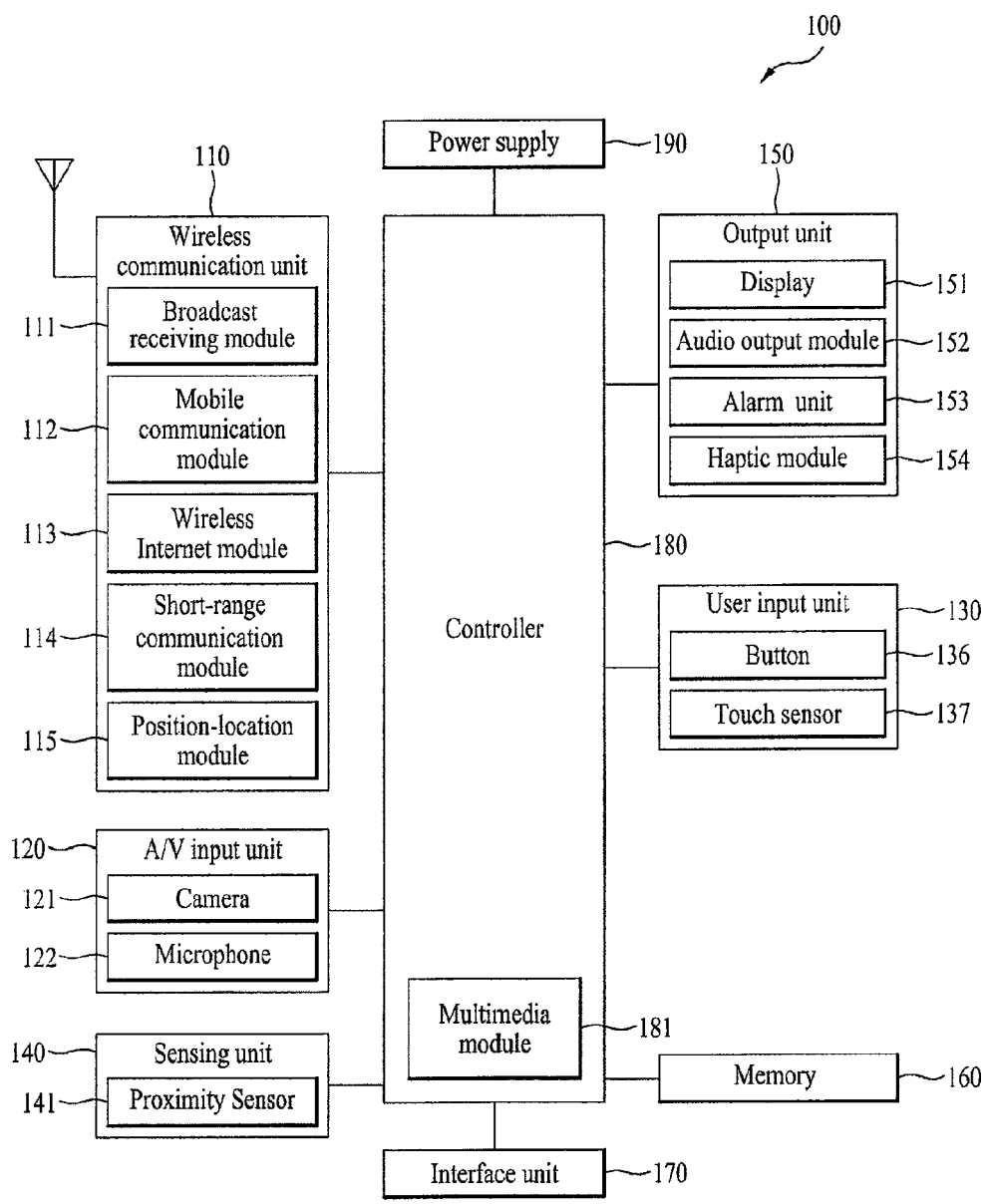
FIG. 20 is a block diagram of a mobile terminal case according to the first embodiment of the present invention.

FIG. 20 is a block diagram of a mobile terminal 100 in accordance with an embodiment of the present invention.

FIG. 20 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 20 shows the mobile terminal 100 having various components, but it is understood that implementing all of the illustrated components is not a requirement. More or fewer components may be implemented according to various embodiments.

In the following description, the above elements of the mobile terminal 100 are explained in sequence.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., base station, external terminal, server, etc.) via a mobile network such as GSM (Gobal System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include NFC (Near Field Communication), radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

Referring to FIG. 20, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 20, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may named 'contact touch'. And, a position, at which the proximity touch is made to the touchscreen using the pointer, may mean a position of the pointer vertically corresponding to the touchscreen when the pointer makes the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include a Near Field Communication (NFC) Chip, User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Next, the detailed structure of the capacitive type stylus and various examples of operations performed in communication between the capacitive type stylus and the case of the mobile terminal will be described as follows, referring to FIGS. 11A to 18B. In the drawings from FIG. 11A, various examples of the capacitive type stylus that can be provided in the present invention are shown based on the stylus according to the first embodiment out of the three embodiments mentioned above.

To distinguish the capacitive type stylus 200 from the components provided in the case 100 of the mobile terminal, a prefix of "first" is given to the short-range communication module provided in the case 100 of the mobile terminal. A prefix of "second" is given to the short-range communication module provided in the capacitive type stylus 200.

In other words, the short-range communication module provided in the case 100 of the mobile terminal will be referenced to as "a first short-range communication module 114" and the short-range communication module provided in the capacitive type stylus 200 will be referenced to as "a second short-range communication module 230" as follows.

Figure 11A:
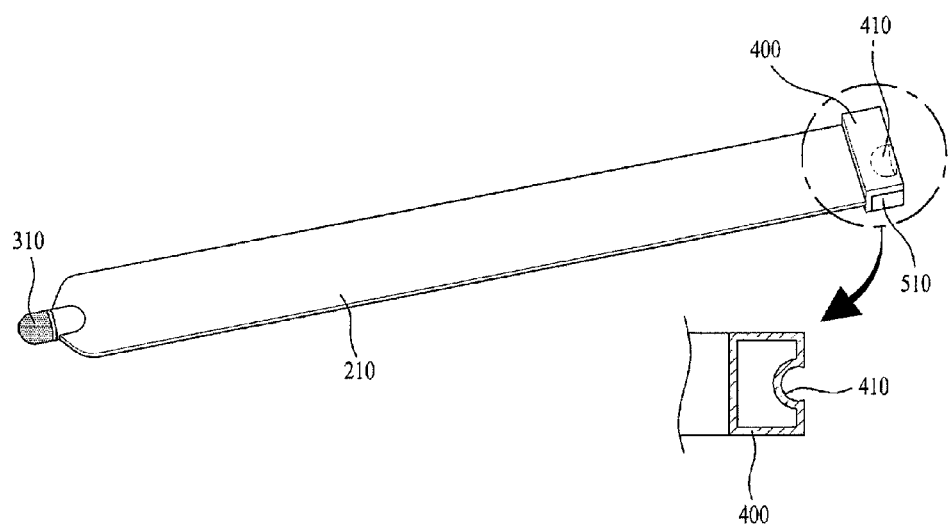
FIGS. 11A and 11B are perspective views illustrating a capacitive type stylus including a module box and a pen tip receiving groove according to one embodiment of the present invention.
Figure 11B:
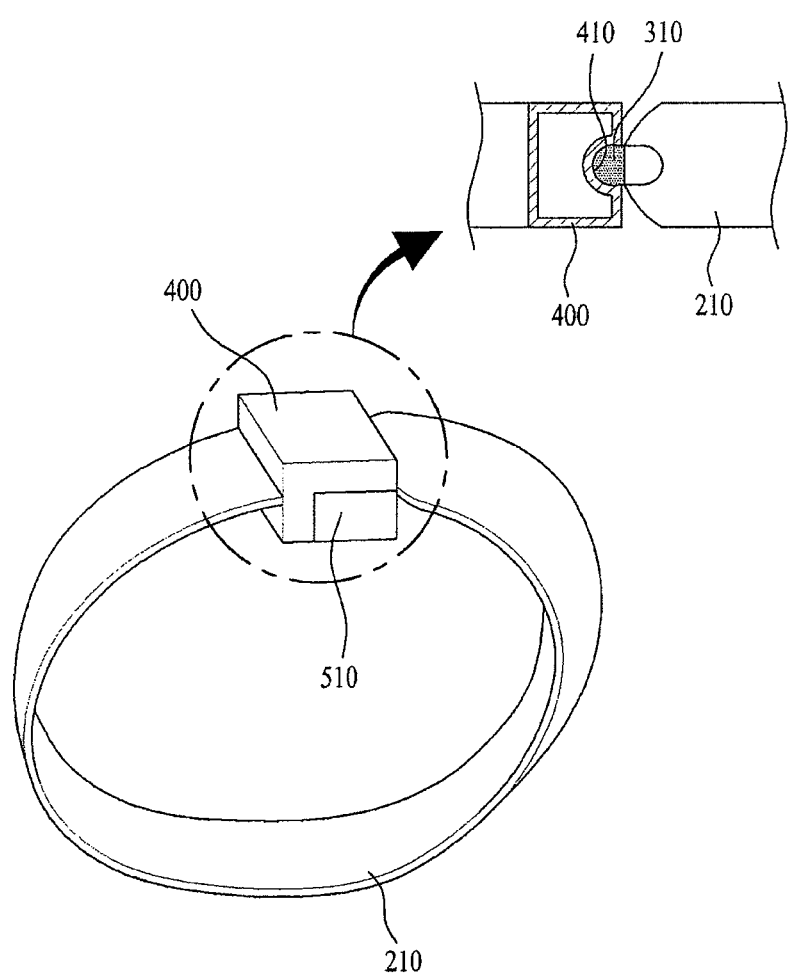

FIGS. 11A and 11B are perspective views of the capacitive type stylus 200 including a module box 400 and a pen tip receiving groove 410 according to one embodiment of the present invention.

As shown in FIG. 11A, a module box 400 having a box shape may be coupled to the opposite end of the body 210 of the capacitive type stylus 200, to the pen tip 300. Various electronic parts are mounted in the module box 400 and such electronic parts are configured of a second short-range communication module 230 and a control module 240 and the like. As shown in FIG. 11A, the module box 400 may be coupled to the end of the body 210 or formed on a surface of the body 210. The module box 400 may be made of injection-molded synthetic resin or it may include a metal. Such a metal includes stainless steel (SUS) or titanium. As shown in FIG. 11A, a battery may be mounted in the module box 400 to supply the electric power to the electronic parts.

A pen tip receiving groove 410 may be formed in an end of the module box 400 coupled to the body 210 of the capacitive type stylus 200. The pen tip receiving groove 410 is recessed from the end of the module box 400 and it may have a predetermined shape and size configured to insert a contacting portion of the pen tip 300 therein. It is preferred that the end of the module box 400 where the pen tip receiving groove 410 is formed is the end in opposite to the pen tip 300 in a straightened state of the body 210 as shown in FIG. 11A.

As shown in FIG. 11B, when the body 210 of the capacitive type stylus 200 is curvedly rolled according to this embodiment, the contacting portion of the pen tip 300 may be inserted in the pen tip accommodation groove 410. The contacting portion is inserted in the pen tip receiving groove 410 and the pen tip 300 positioned in the end of the body 210 is then coupled to the module box 400 provided in the opposite end with respect to the pen tip 300. If necessary, clicking sense may be generated when the contacting portion of the pen tip 300 is inserted in the pen tip receiving groove 410.

In this embodiment, various electronic components are mounted in the module box 400 and various functions can be provided to the capacitive type stylus 200, with no interference of the electronic parts to the deformation of the body 210. Accordingly, the capacitive type stylus 200 can be simply worn by the user on the wrist 10 and the various functions can be realized simultaneously. In addition, when the capacitive type stylus 200 is worn by the user on the wrist 10, the contacting portion of the pen tip 300 is inserted in the pen tip receiving groove 410 and the end of the body 210 may be coupled to the other end of the body. Accordingly, the capacitive type stylus 200 can be worn more stably.

Figure 12:
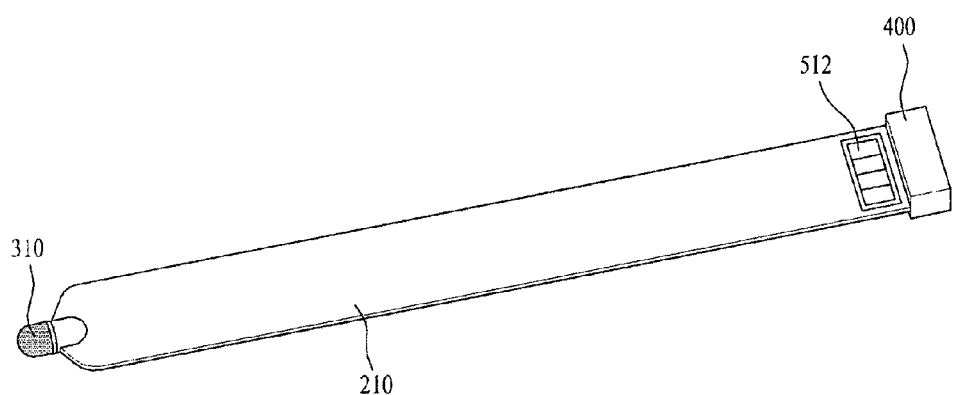
FIG. 12 is a perspective view illustrating a capacitive type stylus further including a solar cell plate according to a further embodiment of the present invention.

FIG. 12 illustrates a capacitive type stylus 200 including a solar cell panel 512 according to another embodiment of the present invention.

As shown in FIG. 12, a solar cell panel 512 may be mounted on a surface of the body 210 of the capacitive type stylus 200. As mentioned above, the solar cell panel 512 may be functioned as the power supply unit of the capacitive type stylus 200. The solar cell panel 512 converts sunlight into electric energy and stores the converted energy therein. It is preferred that the solar cell panel 512 is provided adjacent to the module box 400 as shown in FIG. 12. In this instance, the solar cell panel 512 can provide the power to the second short-range communication module 230, the control module 240 and the others mounted in the module box 400, without complex wiring.

When the solar cell panel 512 is provided in the body 210, no auxiliary battery has to be provided to supply the power to the second short-range communication module 230 and the control module 240. If a battery is provided, the second short-range communication module 230 and the others can be provided with the power even without regular recharging. Accordingly, the usability of the capacitive type stylus 200 may be enhanced.

Figure 13:
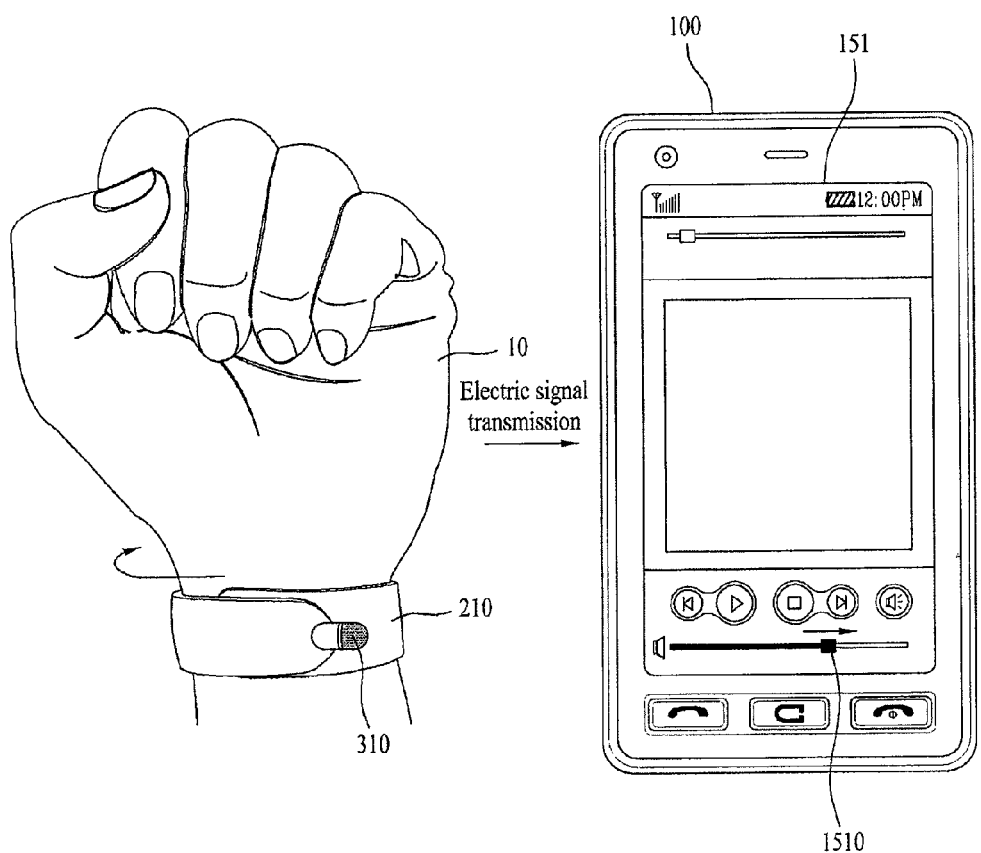
FIG. 13 is a diagram illustrating an example of a method for controlling a mobile terminal, using a movement of a capacitive type stylus according to a still further embodiment of the present invention.
Figure 14A:
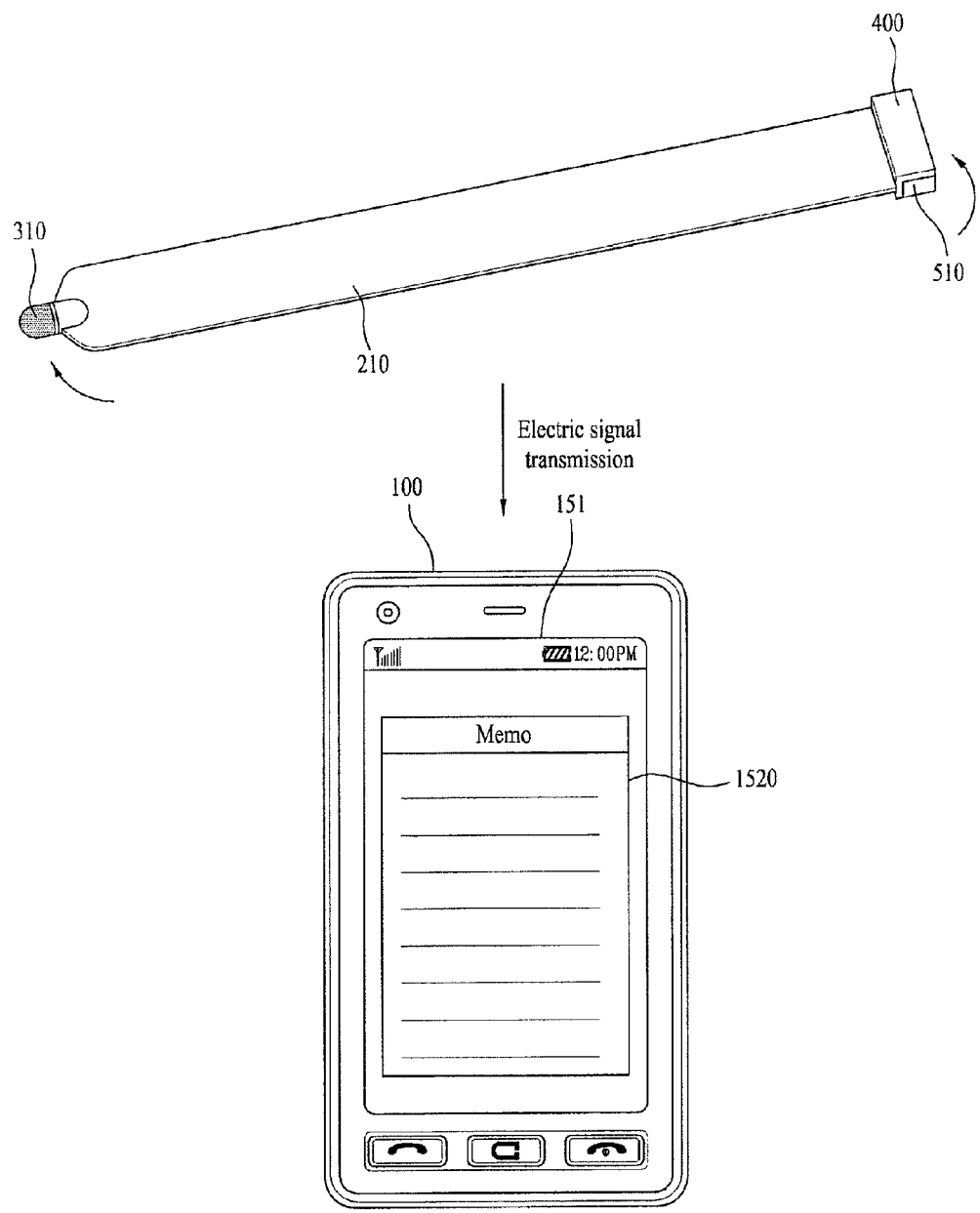
FIGS. 14A and 14B are diagrams illustrating examples of a method for controlling a mobile terminal, using a deformation of a capacitive type stylus according to a still further embodiment of the present invention.
Figure 14B:
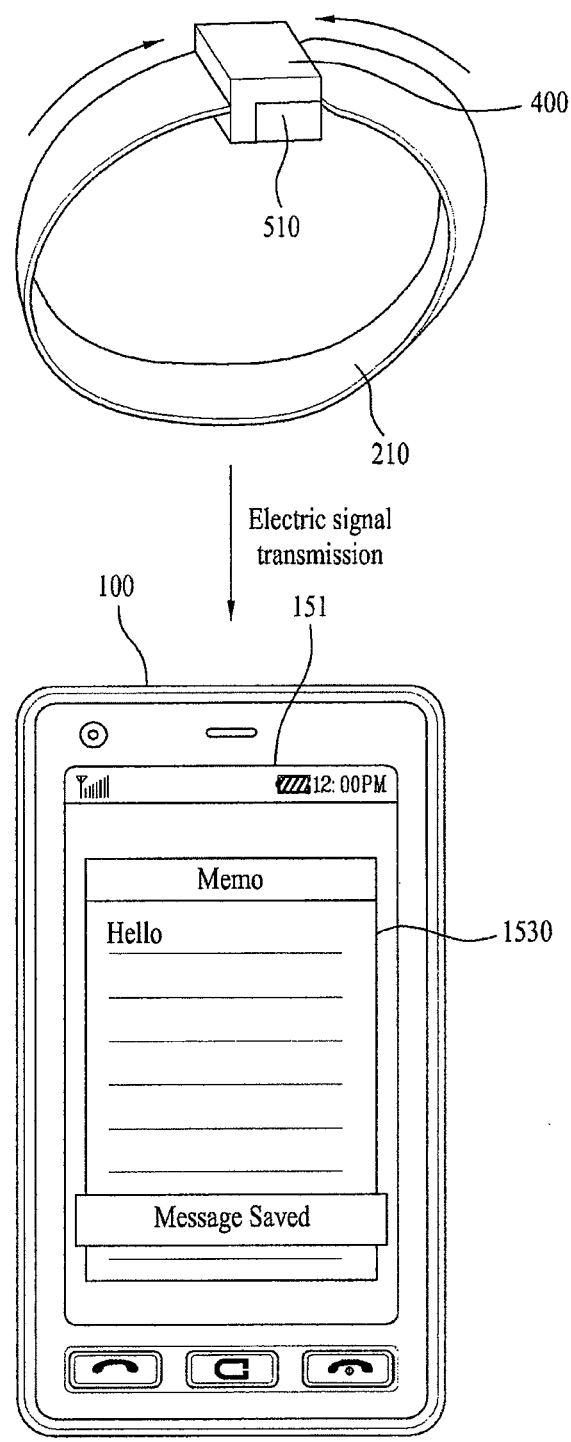

Meanwhile, FIGS. 13 to 14B illustrate examples of a method for controlling the mobile terminal by using motion or deformation of the capacitive type stylus 200.

As shown in FIG. 13, the body 210 of the capacitive type stylus 200 is moving in a specific pattern, the case 100 of the mobile terminal in communication with the capacitive type stylus 200 can be operated according to predetermined methods with respect to the motion. For that, the capacitive type stylus 200 may include a first sensor 251.

The first sensor 251 detects and converts a specific patterned motion into an electric signal. The control module 240 of the capacitive type stylus 200 transmits the electric signal to the case 100 of the mobile terminal via the second short-range communication module 230. Hence, the first short-range communication module receives the electric signal and the controller 180 of the mobile terminal case 100 recognizes the electric signal as a user command, to implement a control command corresponding to the specific patterned motion. In a memory 160 of the mobile terminal case 100 may be stored database including various patterned motions and control commands corresponding to the various patterned motions, respectively.

For example, as shown in FIG. 13, the specific patterned motion may be the rotation of the body 210 of the capacitive type stylus 200 with respect to one axis in a curvedly bent state. That can be easily realized when the user rotates the body 210 in a state of wearing the capacitive type stylus 200 on the wrist 10 as shown in FIG. 13. The first sensor 251 detects the rotation and generates an electric signal corresponding to the rotation. After that, the first sensor 251 transmits the electric signal to the mobile terminal case 100.

The controller 180 of the mobile terminal case 100 provided with the electric signal may implement a control command corresponding to the rotation. As shown in FIG. 13, the control command corresponding to the rotation may be a command for converting a volume of the audio outputted from the mobile terminal. Accordingly, as shown in FIG. 13, the controller 180 may move an audio display 1510 displayed on the display 151 in one direction and increase the volume of the audio.

According to another embodiment, when the body 210 of the capacitive type stylus 200 is deformed in a straightened state as shown in FIGS. 14A and 14B, the mobile terminal case 100 in communication with the capacitive type stylus 200 may be operated according to a method preset with respect to each shape of the body 210. For that, the capacitive type stylus 200 may include a second sensor 252.

The second sensor 252 detects change of the shape from the bent state into the straightened state (hereinafter, referred to as "a first shape deformation") and change of the shape from the straightened state into the curvedly bent state (hereinafter, referred to as "a second shape deformation"). After that, the second sensor 252 converts the detected deformation into an electric signal. The control module 240 controls the second short-range communication module 230 to transmit the electric signal to the mobile terminal case 100. When the first short-range communication module 114 receives the electric signal, the controller 180 recognizes the electric signal as the user command and implements a control command corresponding to the deformed shape. As mentioned above, in the memory 160 of the mobile terminal case 100 may be stored the first shape deformation and the second shape deformation and control commands corresponding to the first and second shape deformations, respectively.

In one case, as shown in FIG. 14A, a control command corresponding to the first shape deformation may be a command for implementing a specific application such as a memo-application before displaying an implementation screen of the application on the display 151. In this instance, the second sensor 252 generates an electric signal when the body 210 is deformed from the bent state into the straightened. The second short-range communication module 230 transmits the electric signal to the mobile terminal case 100. Once receiving the electric signal, the controller 180 of the mobile terminal case 100 implements the memo-application and displays an implementation screen 1520 on the display 151.

In the drawings, only the memo-application is illustrated and one of applications implementing written input made by a pointer such as the finger or the capacitive type stylus 200 may be designated for the first shape deformation.

In this embodiment, applications where the stylus 200 can be used may be implemented automatically by the mobile terminal case 100, as soon as the user linearly straightens the stylus 200 worn on the wrist 10. Accordingly, the user need not operate the mobile terminal case 100 additionally to implement the applications and the usability of the mobile terminal can be enhanced.

In another case, as shown in FIG. 14B, a control command corresponding to the second shape deformation may be a command for finishing a specific application such as a memo-application before storing contents generated in the application in the memory 160. In this instance, the second sensor 252 generates an electric signal when the body 210 is deformed from the straightened state into the bent state. The second short-range communication module 230 transmits the electric signal to the mobile terminal case 100. When receiving the electric signal, the controller 180 of the mobile terminal case 100 stores memo contents 1530 generated before and completes the memo application implemented in the mobile terminal case 100.

In this embodiment, as soon as the user puts on the stylus 200 on the wrist 10 to keep the stylus 200 after completing the usage of the capacitive type stylus 200, the application implemented in the mobile terminal case 100 is completed and contents associated with the application may be stored. Accordingly, the usability of the capacitive type stylus 200 can be enhanced.

Figure 15:
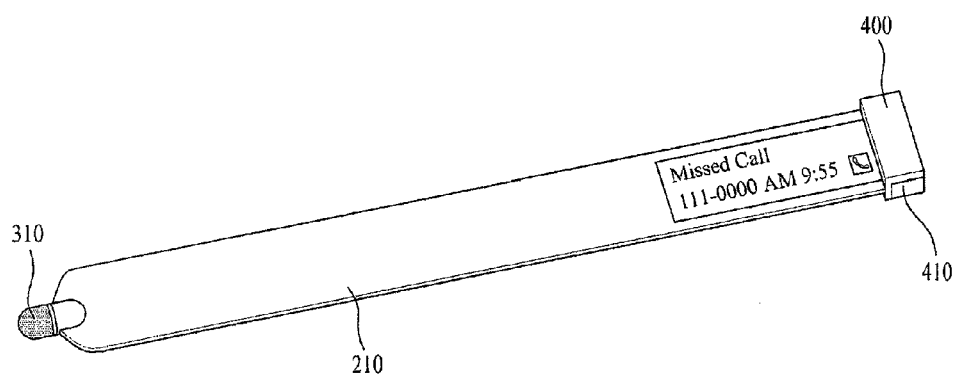
FIG. 15 is a perspective view illustrating a capacitive type stylus further including a display module according to a still further embodiment of the present invention.
Figure 16:
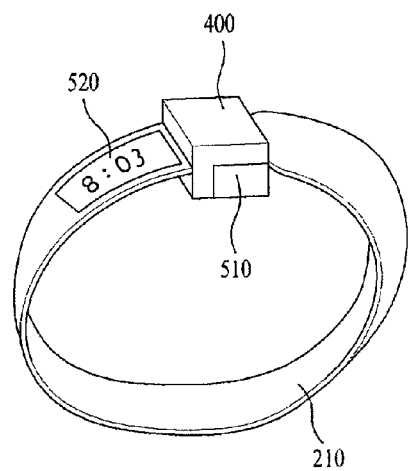
FIG. 16 is a diagram illustrating an example of changing a screen of a display module based on a shape of a capacitive type stylus according to a still further embodiment of the present invention.

FIGS. 15 and 16 illustrate a capacitive type stylus 200 according to a further embodiment of the present invention that further includes a display module 520 formed in a body 210.

As shown in FIG. 15, a display module 520 may be formed in a surface of the body 210 to display the data transmitted from the mobile terminal case 100. The display module 520 may be electrically connected with a battery and electronic parts mounted in a mounding box. A second short-range communication module 230 receives data associated with transmitting/receiving a call signal, message and SNS from a first short-range communication module 114. When the second short-range communication module 230 receives the data, the second module 240 controls the display module 520 to display the data.

In one embodiment, various mode screens may be displayed on the display module 520. Screen modes that can be displayed on the display module 520 may include a receiving inform mode, a clock mode and a biometric information display mode In the receiving inform mode, the display module 520 displays information associated with the mobile terminal case 100 receiving a call signal, a message and SNS in communication with another mobile terminal. In the clock mode, the display module 520 displays a digital clock. In the biometric information display mode, the display module 520 displays biometric information including the user's ECG, temperature and etc.

The biometric information display mode will be described in detail as follows. The capacitive type stylus 200 according to the present invention collects biometric information data on the user wearing the capacitive type stylus 200 on the wrist 10 and outputs the collected data on the display module 520. For that, the capacitive type stylus 200 may include a third sensor 253. The third sensor 253 collects the user's biometric information data and the control module 240 controls the biometric information to be displayed on the display module 520.

Optionally, the user's biometric information data collected by the third sensor 253 may be displayed on the display 151 of the mobile terminal case 100. In this instance, the control module 240 controls the second short-range communication module 230 to transmit the collected biometric information data to the mobile terminal case 100. The user may select or change whether the biometric information data is displayed on the display module 520 of the capacitive type stylus 200 or on the display 151 of the mobile terminal case 100.

The display module 520 provided in the capacitive type stylus 200 enables the user to acquire the received and transmitted information of the mobile terminal case 100, without seeing the case 100 directly. Accordingly, the inconvenience of taking out the mobile terminal whenever a call signal and a message are received can be reduced. Together with that, the display module 520 may be employed as a watch and a biometric information display. As a result, the usability of the capacitive type stylus and the mobile terminal may be enhanced.

As shown in FIG. 16, the screen mode displayed on the display module 520 may be changed according to the shape deformation of the body 210 composing the capacitive type stylus 200. As mentioned above, the body 210 may be deformed from the bent state into the straightened state (the first shape deformation) or from the straightened state into the bent state (the second shape deformation). At this time, the control module 240 controls the display module 520 to display another screen different from the displayed screen when the second sensor 252 detects the first shape deformation or the second shape deformation.

For example, as shown in FIG. 15, the display module 520 may display a receiving inform mode screen informing that the mobile terminal receives a call signal in the straightened state of the body 210. When the body 210 is rolled in this state, the screen of the display module 520 is automatically changed into a clock mode screen as shown in FIG. 16. This drawing is one of examples and the change of the screen modes is not limited thereto. In this instance, when the user linearly straightens the body 210 to use the capacitive type stylus 200 or rolls the body 210 to store the stylus 200, the screen of the display module 520 is automatically changed and the usability of the capacitive type stylus 200 can be enhanced accordingly.

Figure 17:
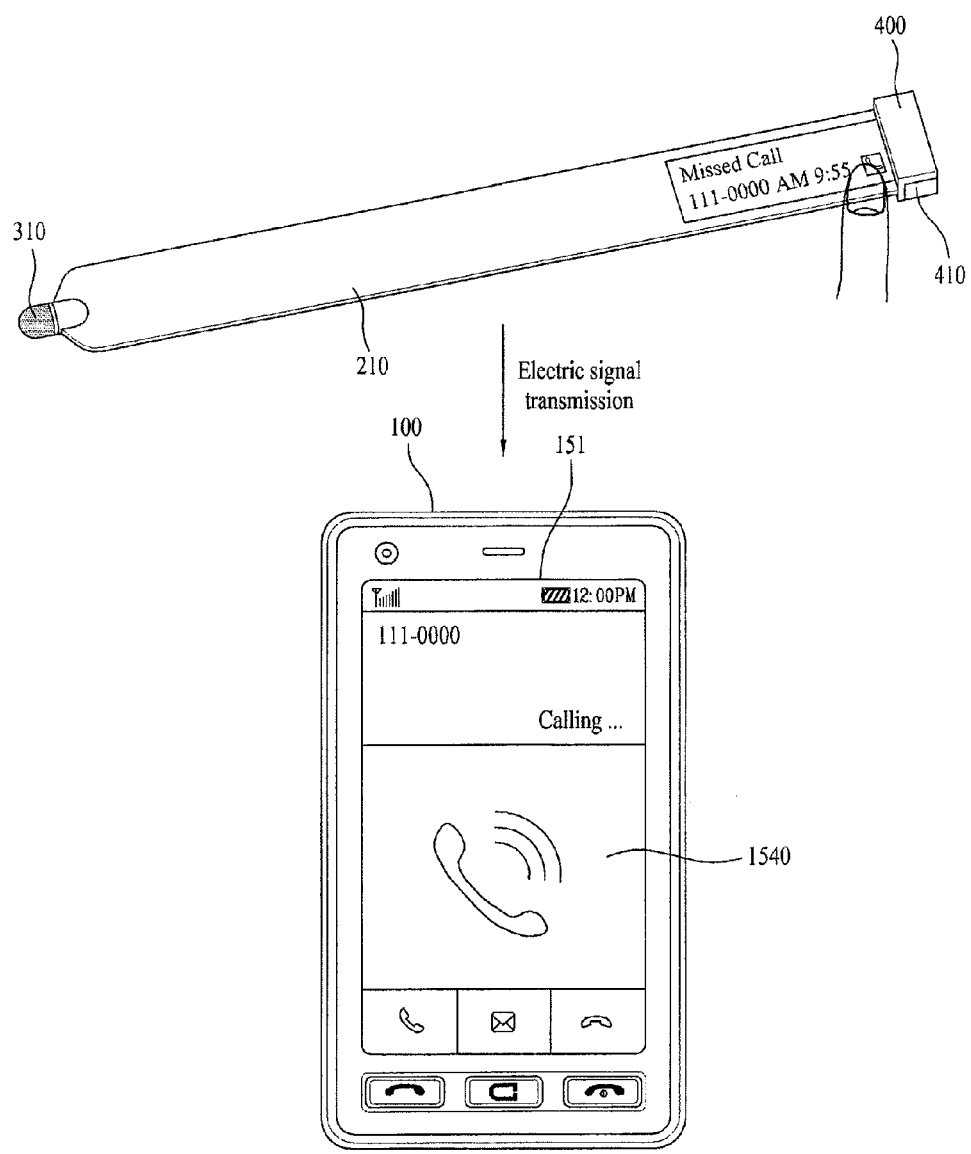
FIG. 17 is a diagram illustrating an example of a method for controlling a mobile terminal, using a touchscreen of a display module according to still further embodiment of the present invention.

FIG. 17 illustrates an example of a method for controlling the mobile terminal case 100 by using the touchscreen of the display module 520.

In this embodiment, the display module 520 may be configured of a touchscreen. The display module 520 detects touch input on the touchscreen and converts the detected touch input into an electric signal. After that, it may transmit the converted electric signal to the control module 240. The control module 240 may control the second short-range communication module 230 to transmit the electric signal to the mobile terminal case 100 when detecting the touch input on the touchscreen. When the mobile terminal case 100 receives the electric signal, the controller 180 of the mobile terminal case 100 implements a command corresponding to the electric signal and controls the mobile terminal according to the touch inputted on the touchscreen.

Specifically, as shown in FIG. 17, a receiving inform mode for informing a missed call may be displayed on the display module 520 configured of the touchscreen. In this state, the user may touch a call connecting icon displayed on the touchscreen. The touchscreen detects the touch input and transmits an electric signal to the mobile terminal case 100. As shown in FIG. 17, the controller 180 of the mobile terminal case 100 receiving the electric signal may call a call signal to the number of the missed call according to the touch input. Accordingly, the user only touches the capacitive type stylus 200 to make a command for a simple work on the mobile terminal and the usability of the capacitive type stylus may be enhanced.

Figure 18A:
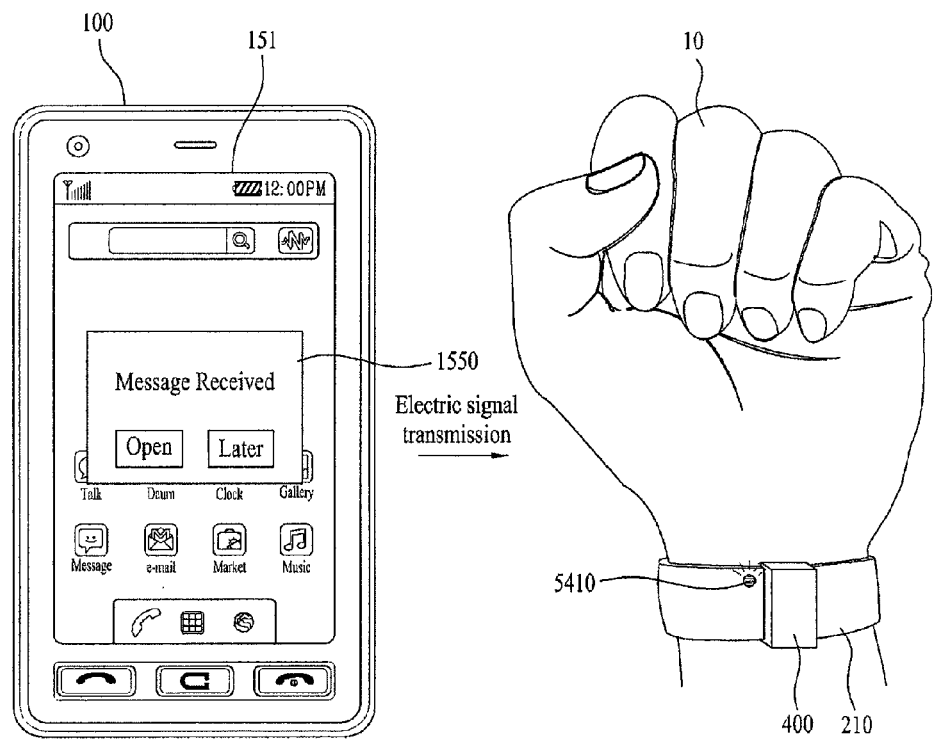
FIGS. 18A and 18B are diagrams illustrating examples of a capacitive type stylus further including an informing module for informing an event generated in a mobile terminal according to a still further embodiment of the present invention.
Figure 18B:
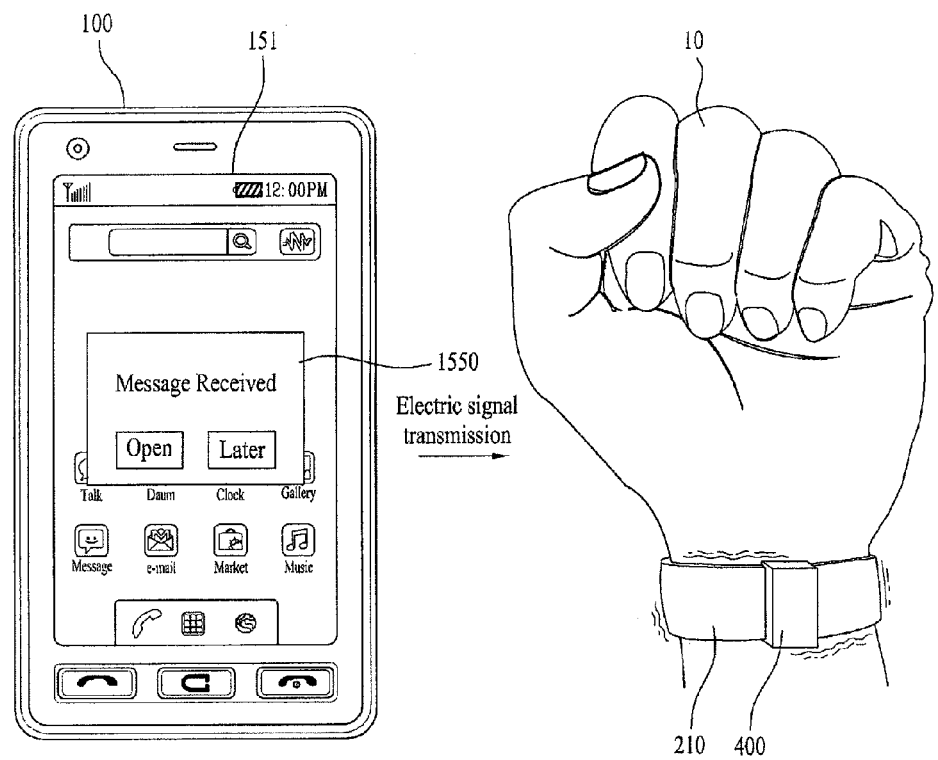

FIGS. 18A and 18B illustrates various examples of a capacitive type stylus according to a still further embodiment that includes an informing module 540 that informs an event generated in the mobile terminal case.

As shown in FIGS. 18A and 18B, a body 210 of the capacitive type stylus 200 according to this embodiment may further include an informing module 540. As mentioned above, the informing module 40 outputs a signal to inform the user of an event generated in the mobile terminal case 100 such as call signal receiving, message receiving and the like. For that, the first short-range communication module 114 of the mobile terminal case 100 may transmit an electric signal to the second short-range communication module 230 of the capacitive type stylus 200, when the mobile terminal case 100 receives a call signal or a message. The control module 240 of the capacitive type stylus 200 controls the informing module 540 to output a signal, when receiving the electric signal via the second short-range communication module 230. The informing module 540 may include at least one of a LED device, a vibrating device and a bone conduction vibrating device. The type of the signal generated in the informing module 540 may be differentiated according to the specific configuration of the informing module 540. The signal generated in the informing module 540 may include specific color light, sound and vibration.

As one example, as shown in FIG. 18A, the informing module 540 may be a light emitting diode (LED) device 5410. As shown in FIG. 18A, the mobile terminal receives a message and the mobile terminal case 100 transmits an electric signal to the capacitive type stylus 200. In this instance, the control module 240 of the capacitive type stylus 200 receiving the electric signal controls the LED device 5410 to emit a specific color light. If the mobile terminal case 100 receives a call signal, the LED device 5410 may emit another color light.

As another example, as shown in FIG. 18B, the informing module 540 may be a vibrating device. Similar to FIG. 18A, the mobile terminal receives a message and the case 100 transmits an electric signal to the capacitive type stylus 200. In this embodiment, the capacitive type stylus 200 receives the electric signal and the vibrating device generates vibration. As shown in FIG. 18B, when the user wearing the capacitive type stylus 200 on the wrist 10 to store, the vibration can be delivered to the user effectively.

As a further example, the informing module 540 maybe a bone conduction vibration device. Such a bone conduction vibration device vibrates the bone possessed by the user contacting with the body 210 to make him or her to hear a sound. When the mobile terminal receives the message, the electric signal is transmitted to the capacitive type stylus 200 and the bone conduction vibration device may output vibration. If the user is wearing the capacitive type stylus 200 on the wrist 10 for storage, the vibration of the bone conduction vibration device vibrates the user's bone to make the user hear an informing sound. In this instance, the informing sound cam be transmitted to the user's ears effectively, compared with the informing sound transmitted through the air. Accordingly, definite informing may be enabled and such the informing sound is not heard by the other people not wearing the capacitive type stylus 200 only to enhance convenience.

According to this embodiment, the user can be effectively informed via the capacitive type stylus 200 whether the mobile terminal receives a call signal or message. Accordingly, even if storing the mobile terminal case 100 in another space, the user can make response to a call signal or message without missing.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A capacitive type stylus comprising:
   a body made of a conductive material, the body being configured to be elastically deformed in a straightened state to a bent state;
   a cover configured to cover at least a portion of the body; and
   a pen tip connected to a first end of the body,
   wherein the body includes:
      a first supporting portion having an end coupled to the first end of the body and another end in which the pen tip is fixed;
      a second supporting portion coupled to a second end of the body; and
      a length adjusting module provided in the second supporting portion, the length adjusting module including:
         an insert screw inserted in the second supporting portion in a longitudinal direction of the body; and
         an adjusting screw rotatably coupled to the second supporting portion in a direction perpendicular to the longitudinal direction of the body and configured to engage with the insert screw,
         wherein a portion of the adjusting screw is exposed via a side surface of the second supporting portion, and
         wherein the insert screw moves along the longitudinal direction of the body when the adjusting screw is rotated.

2. The capacitive type stylus according to claim 1, wherein the pen tip projects longitudinally from the first end the body.

3. The capacitive type stylus according to claim 2, wherein the pen tip is made of a metal and forms a longitudinally extended shape, and
   wherein the pen tip includes:
      a connecting portion having a first end and a second end, the first end being coupled to the first end of the body; and
      a contacting portion made of a conductive and elastic material configured to cover the second end of the connecting portion.

4. The capacitive type stylus according to claim 3, wherein an inserting groove is formed in an end surface of the first end of the pen tip, and
   wherein the first end of the body is inserted in the inserting groove.

5. The capacitive type stylus according to claim 3, wherein the connecting portion is detachably coupled to the body.

6. The capacitive type stylus according to claim 5, wherein a screw thread is formed on an outer peripheral surface of the connecting portion, and
   wherein a fastening groove is formed in the first end of the body, the fastening groove being configured to receive the screw thread of the connection portion.

7. The capacitive type stylus according to claim 3, wherein the connecting portion is integrally connected to the body so as to be extended from the first end of the body.

8. The capacitive type stylus according to claim 1, wherein the pen tip is made of a conductive and elastic material covering the first end of the body.

9. The capacitive type stylus according to claim 1, wherein the cover is made of an elastic material, and
   wherein the elastic material comprises at least one of specific colored silicon, rubber, urethane, fabric and leather.

10. The capacitive type stylus according to claim 1, wherein the cover is made of a conductive material.

11. The capacitive type stylus according to claim 1, wherein the body is formed of one or more metal cables.

12. The capacitive type stylus according to claim 11, wherein the length adjusting module is configured to be extendible in a longitudinal direction of the body.

13. The capacitive type stylus according to claim 11, further comprising:
   a battery mounted in one of the first and the second supporting portions to supply an electric power; and
   a display module formed in the other of the first and the second supporting portions to output an image by using the electric power provided by the battery via the one or more metal cables.

14. The capacitive type stylus according to claim 1, further comprising:
   a short-range communication module mounted to the second end of the body and configured to communicate with a mobile terminal located within range of the short-range communication module; and
   a control module configured to control the short-range communication module to transmit and receive an electric signal to and from the mobile terminal.

15. The capacitive type stylus according to claim 14, further comprising a sensor configured to detect a bent state and a straightened state of the body and to generate an electric signal accordingly,
   wherein the short-range communication module is controlled to transmit the electric signal to the mobile terminal when deformation of the body between the bent state and the straightened state is detected.

16. The capacitive type stylus according to claim 14, further comprising:
   a module box coupled to the second end of the body, the module box being configured to hold the short-range communication module and the control module therein,
   wherein a pen tip receiving groove configured to receive a contacting portion of the pen tip is formed in an end of the module box.

17. The capacitive type stylus according to claim 14, further comprising a display module formed in a surface of the body,
> wherein the control module controls the display module to display data transmitted from the mobile terminal.

18. The capacitive type stylus according to claim 17, wherein the display module is controlled to display a screen corresponding to the bent state and the straightened state when deformation of the body between the bent state and straightened state is detected.

* * * * *